No. 634,067. Patented Oct. 3, 1899.
R. H. PLASS.
SELF PROPELLING VEHICLE.
(Application filed Jan. 9, 1899.)
(No Model.) 7 Sheets—Sheet 1.

Fig. 1.

Witnesses:
F. S. Elmore,
J. L. Hart.

Inventor:
R. H. Plass
By
W. R. Kennedy
Atty.

No. 634,067. Patented Oct. 3, 1899.
R. H. PLASS.
SELF PROPELLING VEHICLE.
(Application filed Jan. 9, 1899.)

(No Model.) 7 Sheets—Sheet 4.

Fig. 4.

Witnesses:
A. M. E. Kennedy.
Arthur Ashley

Inventor:
R. H. Plass
By W. R. Kennedy.
Atty.

No. 634,067. Patented Oct. 3, 1899.
R. H. PLASS.
SELF PROPELLING VEHICLE.
(Application filed Jan. 9, 1899.)

(No Model.) 7 Sheets—Sheet 7.

UNITED STATES PATENT OFFICE.

REUBEN H. PLASS, OF NEW YORK, N. Y., ASSIGNOR TO ISABELLA C. PLASS, OF SAME PLACE.

SELF-PROPELLING VEHICLE.

SPECIFICATION forming part of Letters Patent No. 634,067, dated October 3, 1899.

Application filed January 9, 1899. Serial No. 701,641. (No model.)

*To all whom it may concern:*

Be it known that I, REUBEN H. PLASS, a citizen of the United States, residing at New York, (Brooklyn,) in the county of Kings and State of New York, have invented certain new and useful Improvements in Self-Propelling Vehicles; and I do hereby declare the following to be a full, clear, and exact description of the invention, such as will enable others skilled in the art to which it appertains to make and use the same.

This invention relates to motor-vehicles, and has reference more particularly to self-propelling street-cars, the aim of the invention being to provide for the prompt and easy control of the motion of the car.

The invention consists of an improved driving mechanism by which the car may be started, stopped, reversed, and driven at varying speeds, as will be fully described hereinafter.

The invention also consists in the details of construction and combination of parts hereinafter described and claimed.

In the accompanying drawings.

Referring to the drawings, A represents a form of engine or motor which I prefer to employ, the same being provided with two cylinders A', arranged end to end and connected to a central casing $A^2$, in which is mounted a main driving-shaft B. The shaft is divided, and the two sections have fixed to them within the casing fly-wheels B' B', connected by a crank-pin $B^2$, having joined to it the inner ends of piston-rods $a$, whose outer ends are connected with pistons $A^\times$. These parts are mounted on a truck sustaining the car-body and sustained in turn by wheels H' H' H' H', adapted to travel on the track. Each cylinder has in its outer end an opening $a^2$, communicating with the cylinder by a lateral passage $a^\times$, the opening being controlled by an inwardly-opening spring-seated check-valve $a^3$ for the admission of the explosive charge to the cylinders, which charge is supplied from a tank C, connected to the openings by pipes $b$ $b'$ and containing naphtha or the like. The naphtha in the tank may be retained under pressure by air admitted through pipe $f^3$ from an air-reservoir $F^3$, supplied with air from an air-pump $F^2$, operated by an eccentric F on the main driving-shaft. The explosive charge is drawn in by suction during the power-stroke of the pistons after the explosion of the charge. Adjacent to the inlet-valves are situated outlet-valves $a^4$ for the escape of the products of combustion, which valves have their stems extending inward toward the driving-shaft and are acted on by spiral springs $a^{41}$, which tend to hold them yieldingly to their seats. They are opened against the force of the springs when the pistons arrive at the end of the outer stroke by rods $a^5$, mounted to slide in guides in the casing $A^2$ and operated by an eccentric groove in the outer face of the fly-wheel B', in which groove pins on the rods extend.

The spark necessary for the explosion of the charge in the cylinder is furnished by dynamo E, mounted on the truck and receiving motion from the main shaft of a belt $e$. One pole of the dynamo is connected by a conductor $e'$ with binding-posts $e^3$, situated in the ends of the cylinders and electrically connected with contact-fingers $e^4$, extending through the ends of the cylinders and terminating within the same, the binding posts and fingers being of course insulated in the usual manner. The other pole of the dynamo is connected by the conductor $e^2$ with the casing of the cylinder, and from the casing the current passes to two contact-levers $e^5$, pivoted in the lateral passages $a^\times$. The lower ends of the levers are in position to contact with the fingers $e^4$, while the opposite ends of the levers are engaged by the outlet-valves $a^4$, the arrangement being such that when the outlet-valves are opened to permit the escape of the products of combustion the levers will be rocked and their lower ends separated from the contact-fingers. The levers are rocked to contact with the fingers by means of springs $e^7$, bearing against the upper ends of the same and serving to rock the levers when the outlet-valves are closed and cause their lower ends to contact with the fingers and form the spark. By this arrangement the outlet-valve controls the sparking action of the lever, so that the spark will not be formed until the outlet-valve is closed, at which time the piston is at the outer end of the cylinder compressing the charge.

In the event of the failure of the dynamo to operate I propose to provide for the sparking of the charge by electric batteries $E^2$, situated at one end of the car with its poles connected, respectively, by conductors $e^7$ and $e^8$ with the conductors $e^2$ and $e'$.

Loosely mounted on the driving-shaft is a pulley G, having a peripheral friction-face and forming a part of the means for communicating motion from the engine to the driving-wheels of the car, and in order that the engine may be run continuously and the driving-wheels moved only when desired the pulley is connected to the shaft by a clutch formed by a wheel G', keyed to the outer end of the shaft to slide thereon and having a tapering face designed to enter a correspondingly-formed opening $g'$ in the outer face of the pulley. The wheel G' is provided with a hub $g^2$, formed with a circumferential groove $g^3$, receiving pins $g^4$ on a lever $G^2$, by which means the wheel may be slid back and forth on the shaft to contact with the pulley or disengage the same. The lower end of the lever is pivoted to the frame of the car, and at its upper end it is provided with a strap $g^5$, encircling an eccentric $g^6$, mounted on a rock-shaft $g^7$, extending longitudinally the length of the car and having on its ends beveled gears $g^8$. These gears engage beveled gear $g^{10}$ on the upper end of vertical shafts $g^9$ at the opposite ends of the car, which shafts have fixed to their lower ends beveled gears $g^{11}$, and these latter engage gears $g^{12}$ on the inner ends of horizontal longitudinal shafts $g^{11}$, whose outer ends are geared by wheels $g^{13}$ and $g^{14}$ on the lower ends of vertical shafts $g^{15}$, mounted on the platforms of the car. The upper ends of these shafts are provided with handles $g^{16}$ to be manipulated by the attendant.

From the foregoing description it will be seen that by turning the handles in the proper direction the parts of the clutch may be connected or disconnected and the friction-pulley $g$ caused to rotate with the driving-shaft or remain at rest, as desired. It is obvious that this construction admits of varying the speed of the pulley by varying the force with which the parts of the clutch are brought together.

The pulley $g$ is provided on each side of its friction-face with reduced surfaces encircled by collars $h'$ $h'$, having laterally-projecting arms $h^3$ $h^3$. On the axles of the driving-wheels are loosely mounted frames $H^2$ $H^2$, and each frame is provided with a pin $h^4$, entering a slot in the lateral arm $h^3$, the arrangement being such that the movement of the arms will rock the frames.

$H^3$ $H^4$ represent friction-wheels mounted loosely on the frames, the wheels $H^3$ being so arranged as to constantly maintain contact with friction-wheels H H on the wheels H', and the wheels $H^4$ are mounted so as to maintain contact with the wheels $H^3$. The position of friction-wheel G relative to that of the frames $H^2$ is such that by the movement of the frames up or down the wheels $H^3$ $H^4$ will be brought successively in contact with the wheel G. On one of the frames $H^2$ the wheel $H^3$ is mounted in its upper end and the wheel $H^4$ in the lower end, while on the other this arrangement is reversed, the result being that when the friction-wheel G is moved in the direction indicated by the arrow in Fig. 6 and the collars $h'$ rocked to bring the friction-wheels $H^3$ in contact with the friction-wheel G and wheels H H the driving-wheels H will be driven in the direction indicated by the arrows and impart to the car a forward movement. If now the collars are rocked to the position shown in Fig. 8, the wheels $H^3$ will be moved in contact with the wheels H and the wheels $H^4$ will be moved in contact with the friction-wheel G, the result being that the motion of the car will be reversed. When the parts are moved in an intermediate position, as shown in Fig. 7, both the wheels $H^3$ and $H^4$ will be free to the friction-wheel G and the car will come to a stop.

In order to effect the manipulation of the parts to thus control the motion of the car, I connect with the vertical arm $H^2$ a rod $H^5$, extending longitudinally of the car and terminating adjacent to the platforms, where it is provided on each end with a rack $H^{61}$, engaged by a segment-gear $H^6$, fixed to the upper end of a vertical shaft $H^7$, geared to a horizontal longitudinal shaft $H^8$, extending beneath the platform and in turn geared to the lower end of a vertical shaft $H^9$, having at its upper end a lever $H^{10}$ for manipulating it. The lever $H^{10}$ is provided with a pointer $H^{11}$, beneath which is arranged a dial $H^{12}$, so that the attendant is enabled to operate the lever in a proper direction for driving the car forward or reverse its motion or bring the same to a stop.

Figure 2:
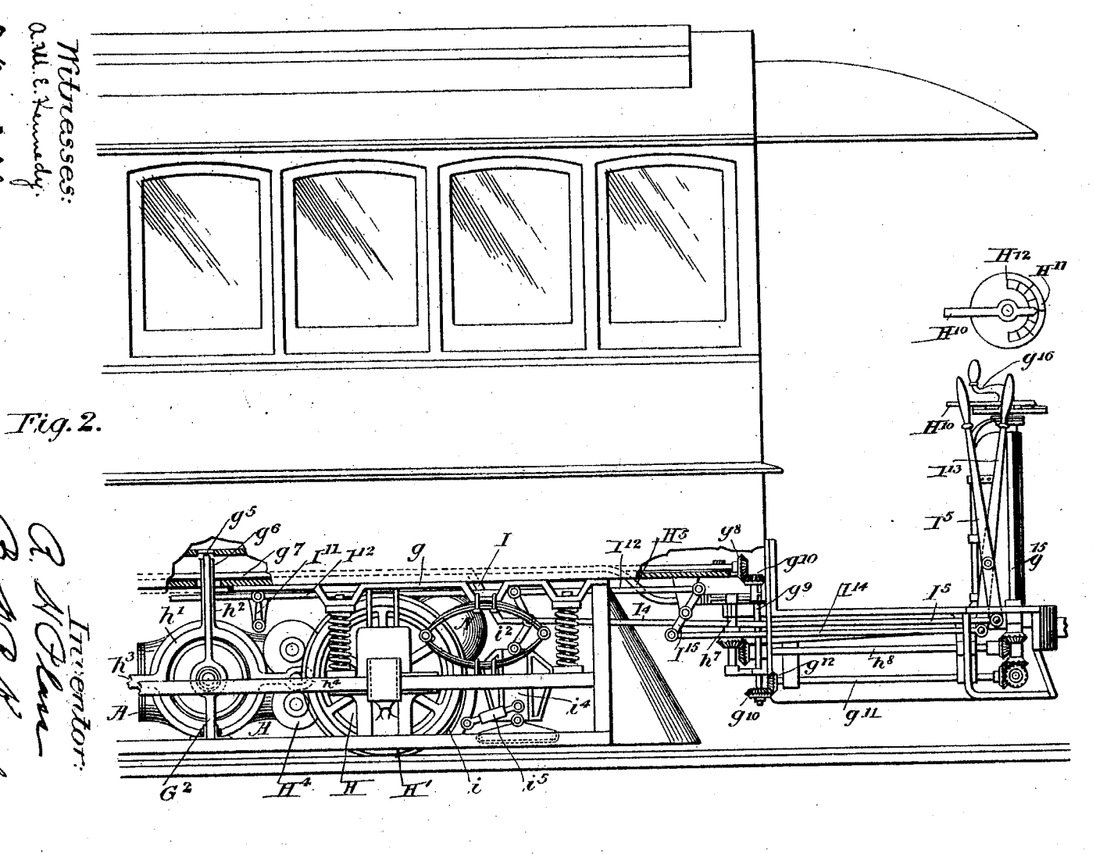
Fig. 2 is a side elevation of one end of a car embodying my invention.
Figure 3:
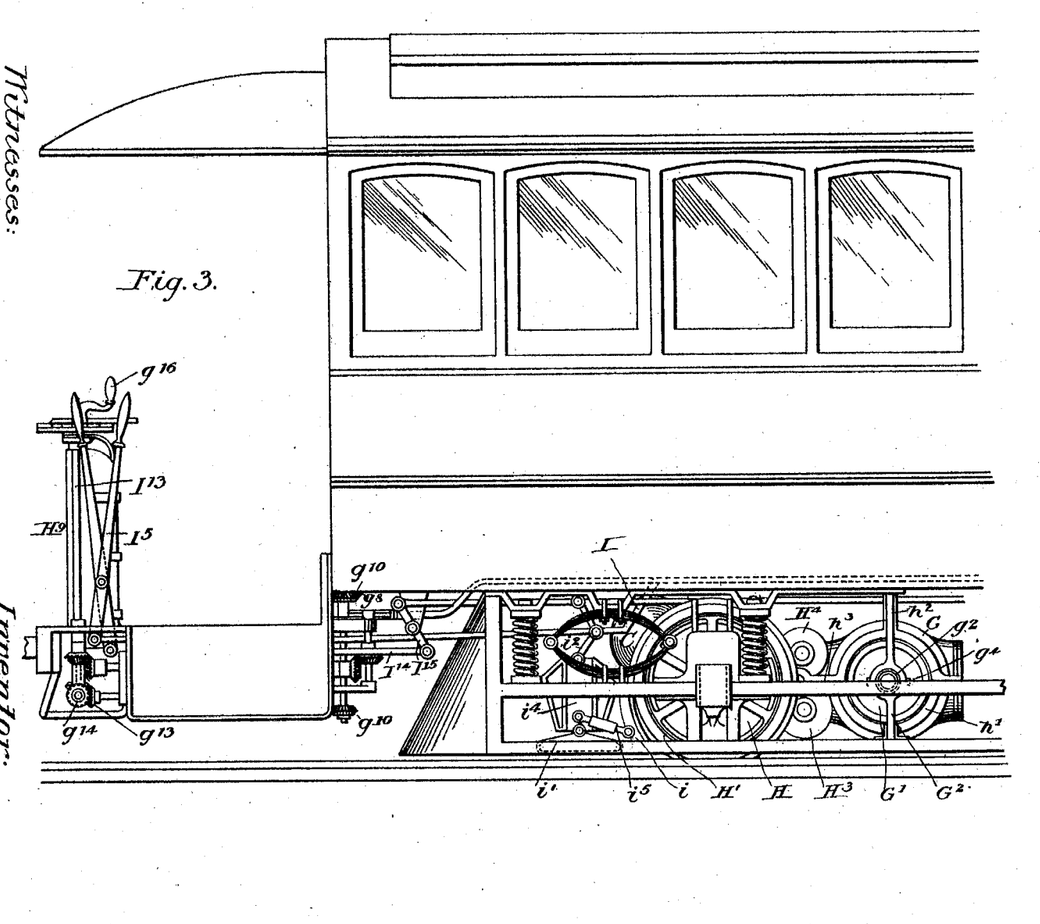
Fig. 3 is a side elevation of the opposite end of the car.
Figure 4:
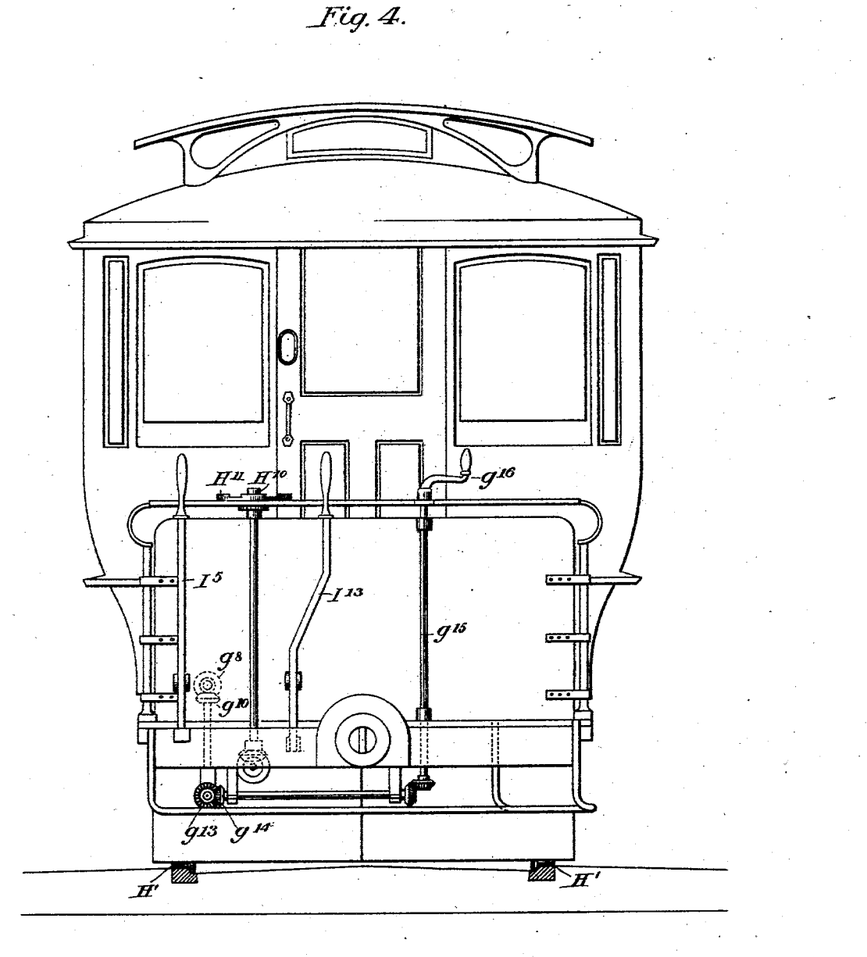
Fig. 4 is an end elevation of the same.
Figure 5:
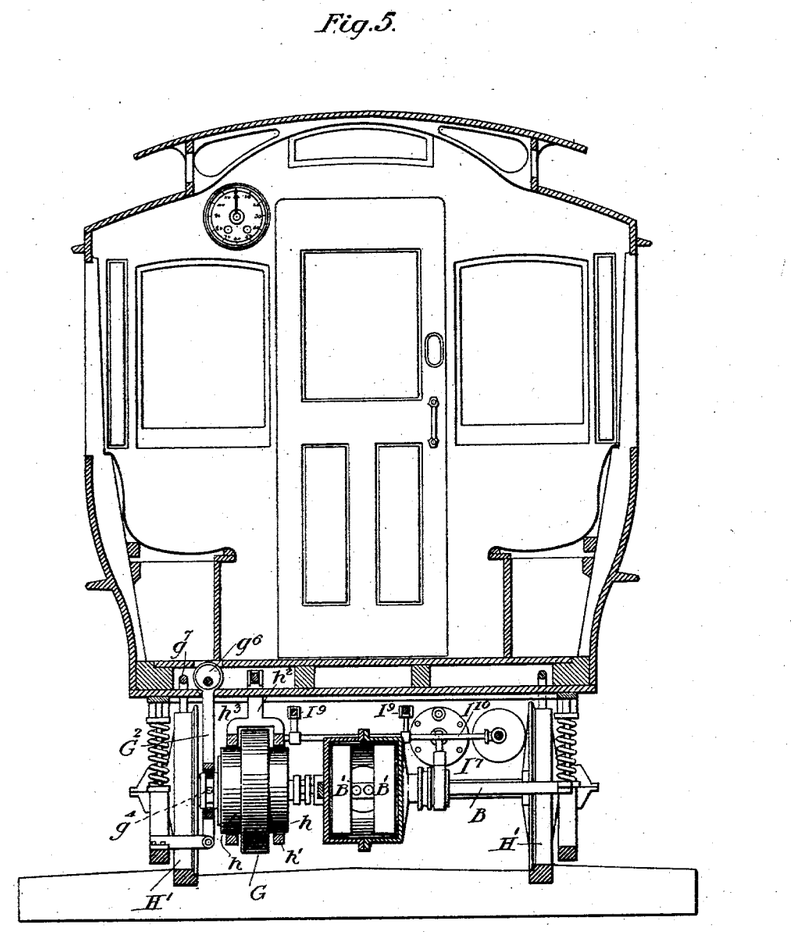
Fig. 5 is a transverse sectional elevation.

In the accompanying drawings I have illustrated a brake mechanism and means whereby it may be operated by hand or by air-pressure from the air-reservoir; but this mechanism forms no part of the present invention. It will be manifest, therefore, that other forms of brakes may be used without in any manner modifying or limiting my present invention, which is based on the driving devices and the means for controlling their operation, as described. This brake mechanism (shown more particularly in Figs. 2, 3, and 5) consists of a wheel-brake $i'$ and track-brakes $i^2$, adjacent to and connected with the wheel-brakes to be operated simultaneously. The track-brakes are connected with the wheel-brakes by links $i^5$ and are joined to plates $i^4$, movable vertically and suspended by toggle-links $i^2$, which are connected by a rod $I^4$ with vertical levers $I^5$, situated at each end of the car. The toggle-levers are connected also with the respective ends of two horizontal levers I, pivoted between their ends at opposite ends of the car in order to cause the simultaneous movement of all the brakes.

To operate the brakes by air-pressure, I connect one of the levers I with the piston of an air-cylinder $I^7$, communicating with the air-reservoir by pipe $I^8$, in which is located a cock from which projects an operating-rod $I^{10}$, having two vertical arms $I^{11}$. From these arms rods $I^{12}$ extend in opposite directions to the ends of the car, where they are jointed to rocking levers $I^{15}$, connected by rods $I^{14}$ with the lower ends of operating-levers $I^{13}$, mounted on the platforms.

Figure 6:
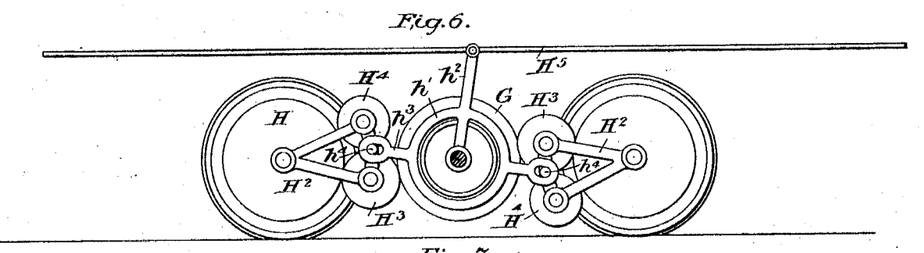
Figs. 6, 7, and 8 are side elevations of the driving mechanism, showing the different positions of the same for driving the car forward, backward, and stopping it.
Figure 7:
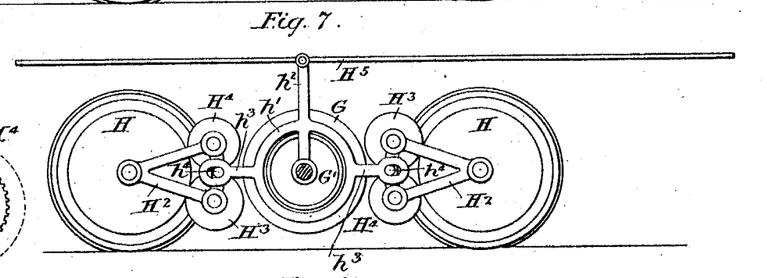
Figure 8:
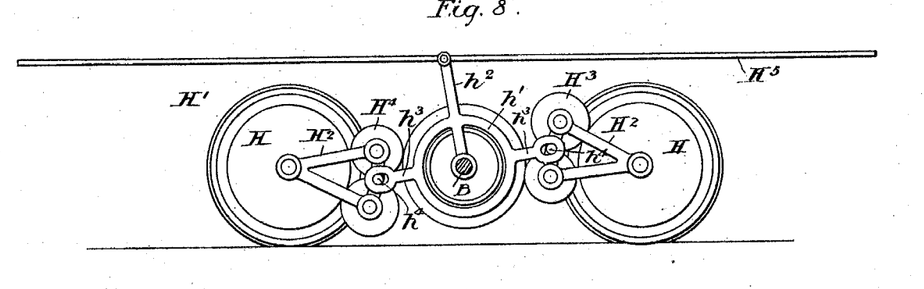
Figure 9:
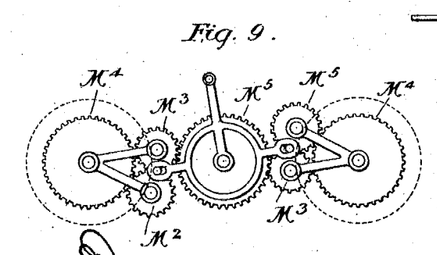
Fig. 9 is a modified form of the driving mechanism.
Figure 10:
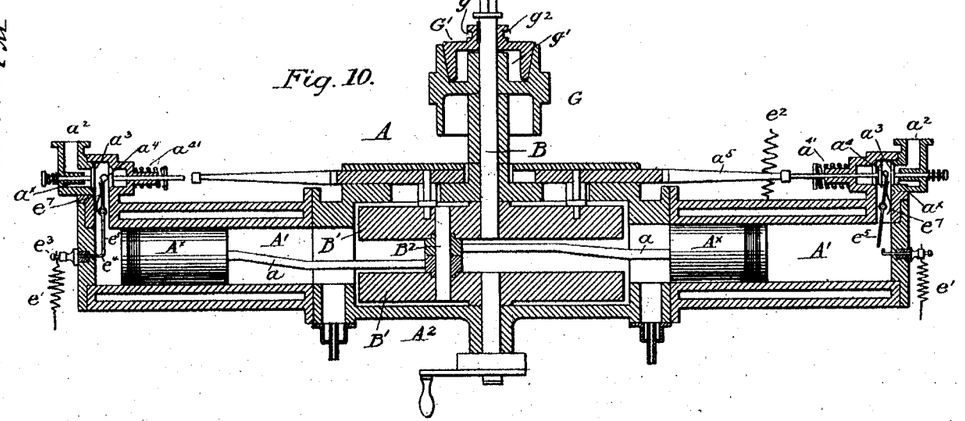
Fig. 10 is a horizontal longitudinal section through the engine.
Figure 11:
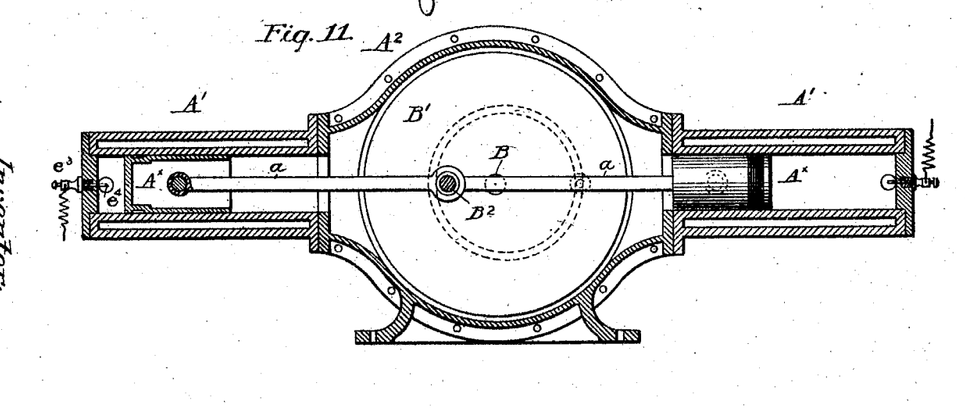
Fig. 11 is a vertical longitudinal section through the same.

In Fig. 9 I have shown a modified form of the driving mechanism shown in Figs. 6, 7, and 8. In this modification instead of using friction-wheels, as described, gear-wheels $M^2$ $M^3$ are mounted and operated similar to the friction-wheels to operate in conjunction with gear-wheels $M^4 M^4$ on the axle of the driving-wheels and a gear-wheel $M^5$ on the engine-shaft. In this case it is necessary to operate the clutch to disconnect the wheel $M^5$ before the gears are engaged; otherwise there would be danger of injury to the teeth. In this case also the speed of the driving-wheel may be regulated by manipulating the clutch to bring the parts more or less closely together.

Figure 1:
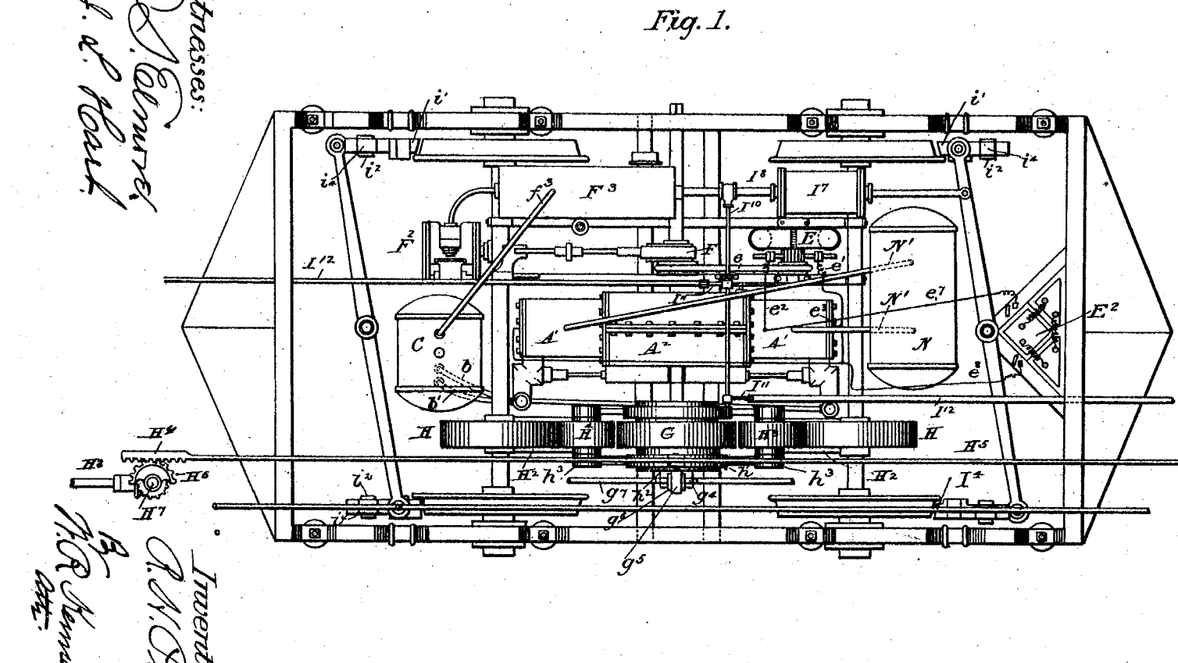
Figure 1 is a plan view of a car-truck having my invention embodied therein.

To prevent the cylinders of the engine from becoming overheated from the explosion of the charge, I provide a water-tank N, Fig. 1, which is connected by suitable pipes N' N' with jackets surrounding the cylinders in such manner that a circulation of water around the cylinders may be effected.

Having thus described my invention, what I claim as new, and desire to secure by Letters Patent, is—

1. A self-propelling car comprising a motor-engine, a shaft driven by the engine and provided with a friction-wheel axles arranged adjacent to the shaft on each side thereof and provided with friction-wheels, movable frames one on each axle and provided with two friction-wheels, one of said wheels being constantly in contact with the friction-wheel on its axle and both being capable of being moved into and out of contact with the friction-wheel on the shaft driven by the motor-engine, the wheels on each frame being in contact with each other, and the wheels on the respective frames being oppositely arranged, substantially as described.

2. A self-propelling car comprising a motor-engine, a shaft driven by the engine and provided with a friction-wheel, axles arranged adjacent to the shaft and provided with friction-wheels, movable frames arranged one on each axle and each provided with two friction-wheels mounted to contact with each other, one of said wheels being in constant contact with the friction-wheel on its axle, and both being capable of being moved into and out of contact with the friction-wheel on the engine-shaft, the positions of the wheels on one frame being the reverse of that on the other, and a frame mounted on the engine-shaft and having arms connected to the frames carrying the wheels, whereby by shifting the frame the positions of the wheels on the frame will be changed, substantially as described.

3. A self-propelling car comprising a motor-engine, a shaft driven by the engine and provided with a friction-wheel axles arranged adjacent to the shaft and provided with friction-wheels movable frames arranged one on each axle and provided with two friction-wheels mounted to contact with each other one of said wheels being in constant contact with the friction-wheel on its axle, and both being capable of being moved into and out of contact with the friction-wheel on the engine-shaft, and a frame mounted on the engine-shaft and having arms connected to the frames carrying the wheels, the frame being provided with a projection, levers mounted at the ends of a car, and a rod connecting the levers and the projection on the frame whereby by moving the levers the positions of the wheels on the frames will be changed, substantially as described.

4. A self-propelling car comprising a motor-engine, a shaft driven by the engine and provided with a friction-wheel having reduced portions, a frame mounted on the reduced portions and capable of turning thereon, the frame being provided with arms having openings therein, axles arranged on opposite sides of the engine-shaft and provided with friction-wheels movable frames mounted one on each axle, each one being provided with two friction-wheels mounted to contact with each other one of said wheels being in constant contact with the friction-wheel on its axle, and both being capable of being moved into and out of contact with the friction-wheel on the shaft, the frames bearing the wheels being provided with pins entering the openings in the arms of the frame on the shaft, substantially as described.

5. A self-propelling car comprising a motor-engine, a shaft driven by the engine and provided with a friction-wheel loosely mounted on the shaft, levers mounted on the ends of the car, a clutch for connecting the friction-wheel to the shaft, a rod connecting the levers and the clutch, axles arranged adjacent to the engine-shaft and provided with friction-wheels, movable frames arranged one on each axle and provided with two friction-wheels mounted to contact with each other, one of said wheels being in constant contact with the friction-wheel on its axle and both being capable of being moved into and out of contact with the friction-wheel on the engine-shaft the positions of the wheels on one frame being the reverse of that on the other, a frame mounted on a shaft and having arms connected to the frames carrying the wheels, the frame being provided with a projection, levers mounted at the ends of the car and rods connecting the levers and the projection on the frame, substantially as described.

6. A self-propelling car comprising a motor-engine, a shaft driven by the engine and provided with a friction-wheel mounted loosely on the shaft, the friction-wheel being provided with a conical opening, a sliding block provided with a projection corresponding to the opening in the friction-wheel and with a circumferential groove, an arm having pins entering the groove, an eccentric for operating the arm, levers mounted on the ends of the car and connected with the eccentric, axles arranged adjacent to the shaft and provided with friction-wheels, movable frames arranged one on each axle and provided with two friction-wheels mounted to contact with each other one of said wheels being in constant contact with the friction-wheel on its axle, and both being capable of being moved into or out of contact with the friction-wheel on the engine-shaft a frame mounted on the engine-shaft and having arms connected to the frames carrying the friction-wheels, and means for moving the frames, substantially as described.

7. In a motor-car, the combination with the motor, of a drive-wheel operated thereby, two driven wheels one on each side of the drive-wheel and operatively connected with the track-wheels, two movable frames, a transmitting-wheel and an idler-wheel mounted loosely in each frame in engagement with each other and oppositely disposed, the said transmitting-wheels being constantly in engagement with the respective driven wheels, and the idlers being adapted to be engaged with or disconnected from the driving-wheel.

8. In a motor-car, the combination with the motor, of a drive-wheel operated thereby, two driven wheels one on each side of the drive-wheel and operatively connected with the track-wheels, two frames pivoted respectively on the axes of the driven wheels and extending inward, transmitting-wheels mounted respectively in the said frames and oppositely disposed and engaging the driving-wheels, idler-wheels also mounted in the respective frames in engagement with the transmitting-wheels, and means for rocking said frames; whereby the idlers may be engaged with or disconnected from the driving-wheel as desired.

In testimony whereof I affix my signature in presence of two witnesses.

REUBEN H. PLASS.

Witnesses:
THOMAS BRADLEY,
BOYD TAYLOR.